United States Patent [19]

Saito et al.

[11] E Re. 28,568

[45] Reissued Oct. 14, 1975

[54] ELECTROPHOTOGRAPHIC COPYING MACHINE

[75] Inventors: Takashi Saito, Tokyo; Yujiro Ando, Yokohama, both of Japan

[73] Assignee: Canon Kabushiki Kaisha, Tokyo, Japan

[22] Filed: Apr. 19, 1974

[21] Appl. No.: 462,327

Related U.S. Patent Documents

Reissue of:

[64] Patent No.: 3,711,796
Issued: Jan. 16, 1973
Appl. No.: 166,820
Filed: July 28, 1971

[30] Foreign Application Priority Data

July 29, 1970 Japan ..... 45-66295
Mar. 30, 1970 Japan ..... 45-26736

[52] U.S. Cl. ..... 355/15; 15/256.51; 118/DIG. 23; 355/10; 427/15

[51] Int. Cl.[2] ..... G03G 15/10; G03G 15/22

[58] Field of Search ..... 15/1.5, 256.51; 96/1 LY; 117/37 LE; 118/104, 203, DIG. 23; 354/297, 325; 355/3 R, 10, 15; 427/15

[56] References Cited

UNITED STATES PATENTS

| | | | |
|---|---|---|---|
| 2,634,221 | 4/1953 | McAlpine et al. | 15/256.51 X |
| 2,878,120 | 3/1959 | Mayer et al. | 355/17 X |
| 2,889,758 | 6/1959 | Bolton | 118/DIG. 23 X |
| 3,011,474 | 12/1961 | Ulrich | 355/15 X |
| 3,186,838 | 6/1965 | Graff et al. | 15/1.5 X |
| 3,372,027 | 3/1968 | Gundlach et al. | 355/10 X |
| 3,500,793 | 3/1970 | Bartusek | 354/319 X |
| 3,552,850 | 1/1971 | Royka et al. | 355/15 |
| 3,654,654 | 4/1972 | Abreu et al. | 15/1.5 |
| 3,660,863 | 5/1972 | Gerbasi | 15/256.51 |

*Primary Examiner*—Fred L. Braun
*Attorney, Agent, or Firm*—Fitzpatrick, Cella, Harper & Scinto

[57] ABSTRACT

An electrophotographic copying machine of the type using a drum type photosensitive medium provided with a cleaning system. The cleaning system includes a blade of resilient material oriented in a counterdirection relative to the direction of movement of the photosensitive medium and having one edge disposed in contact with the medium, a cleaning tank, and circuitry for applying cleaning liquid to the areas of the medium and the blade near the contact area therebetween before the process is started.

29 Claims, 6 Drawing Figures

ELECTROPHOTOGRAPHIC COPYING MACHINE

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to electrophotographic copying machines of the type using liquid type developing-transferring processes, and more particularly to a novel cleaning device in such machines for cleaning the surface of a photosensitive medium and removing and collecting any residual developing liquid from the surface of *the* photosensitive medium.

2. Description of the Prior Art

In the electrophotographic copying machines of the described type, the residual developing liquid remaining on the surface of the photosensitive medium after image transfer may be solidified due to the [ deffeciency ] *deficiency* of *the* carrier liquid therein. The developing liquid also tends to remain unremoved in the contact area between the photosensitive medium and the blade and solidify due to the evaporation of the carrier liquid while the machine is out of operation. Such solidified developing liquid, i.e. solidified toner, would build up between the photosensitive medium and the blade and impart damages to the surface of the photosensitive medium or the blade when the machine resumes operation. This is more likely to occur at the beginning of every day service.

SUMMARY OF THE INVENTION

The foregoing problems existing in the prior art may be solved by the present invention, which enables either cleaning liquid serving as carrier or developer or liquid for exclusive use as cleaning liquid to be applied to the photosensitive medium and to the blade, thereby bringing any solidified toner thereon into wet condition and thus cleaning up the photosensitive medium by means of the blade.

The present invention is applicable to an electrophotographic copying machine in which the surface of a drum type photosensitive medium is subjected to a series of usual electrophotographic processes such as electrostatic latent image formation, development, transfer, cleaning. The present invention is particularly concerned with the cleaning process succeeding to the transfer process, i.e. removal of any residual developing liquid left on the surface of the photosensitive medium by the use of a blade. During the cleaning process, the cleaning liquid is ejected to the areas of the blade and photosensitive medium near the contact area therebetween and the cleaning or developing liquid impinging on the blade is flowed for collection along the grooves formed at the opposite end portions of the photosensitive drum. Such ejection of the liquid is most effective when the machine is used after a temporary cessation of operation or at the beginning of its daily service. The drum type photosensitive medium remains stationary without rotation until the solidified toner or the like on and near the blade is wetted.

Embodiments of the present invention will be described hereunder in conjunction with the accompanying drawings.

BRIEF DESCRIPTION OF THE DRAWINGS:

FIG. 3 ( b ) is a schematic medial, sectional view showing the distributor of FIG. 3(a) in its position for distributing liquid solution to the cleaning liquid application means;

FIG. 3 ( c ) is a schematic medial, sectional view similar to FIG. 3(b), but showing the distributor in its position for distributing liquid to both the developing means and the cleaning liquid application means;

DESCRIPTION OF THE PREFERRED EMBODIMENTS

Figure 1:
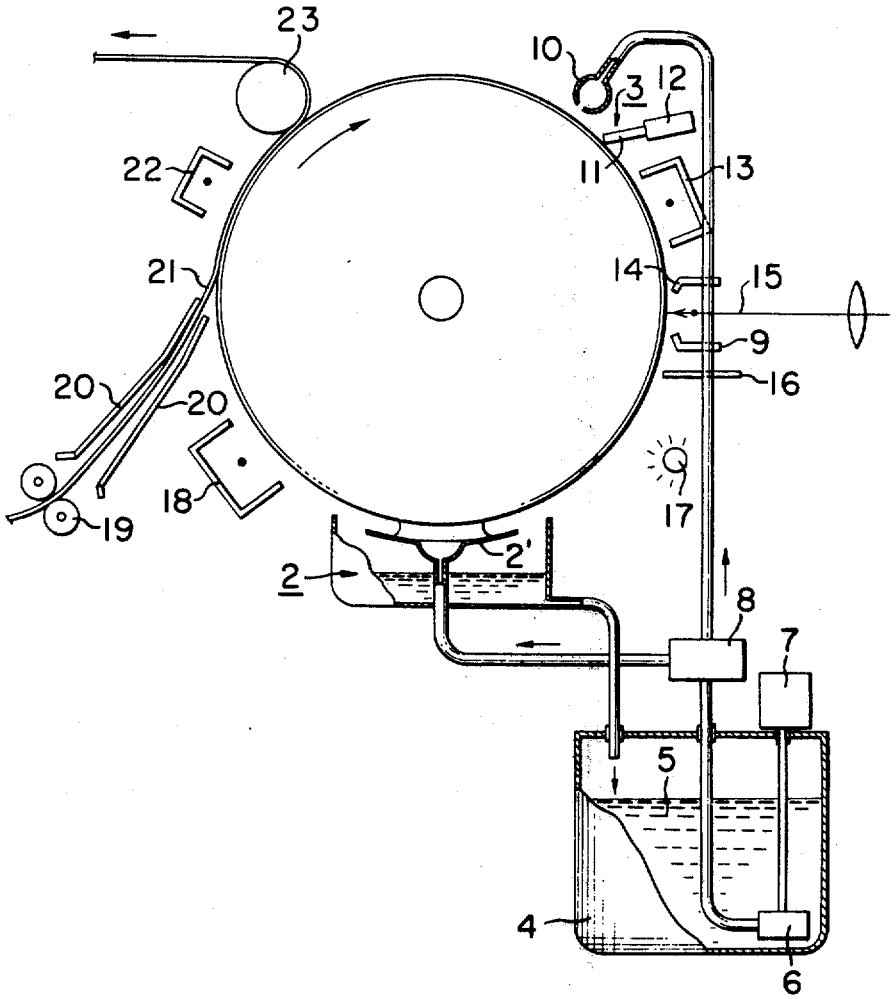
FIG. 1 is a schematic illustration of an embodiment of the electrophotographic copying machine of the type in which cleaning liquid is ejected down to a drum type photosensitive medium and to a blade adjacent thereto.
Figure 1A:
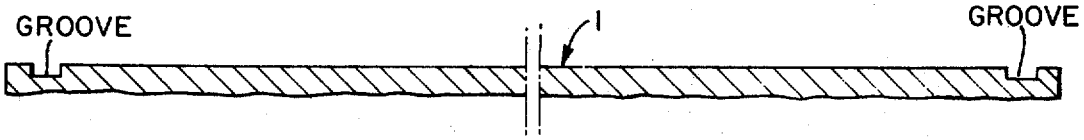
*FIG 1a is a schematic cross-section of the drum type photosensitive medium shown in FIG 1.*

Referring to FIG. 1, there is shown a drum type electrophotographic copying machine, and more particularly, an arrangement for supplying cleaning liquid to a cleaning portion. The machine includes various means arranged around a drum type photosensitive medium 1 rotatable in the direction of arrow, such as primary charger 13, AC corona discharger 14, light image exposure means 15, whole surface exposure means 17, liquid type developing means 2, post charger 18, transfer means 21, cleaning means which will be described. In FIG. 1, the liquid type developing means 2 and the blade type cleaning means are shown particularly in detail. Cleaning liquid supply means is so constructed that developing liquid 5 in a tank 4 for the developing means 2 may be utilized as cleaning liquid. The machine is such that when the main switch thereof (not shown) is closed, a drive source 7 for liquid delivery means 6 such as *a* centrifugal pump or the like is energized to supply the developing liquid 5 from the tank 4 through distributor means 8 into a pipe 9 terminating at a spray conduit 10, through which the developing liquid is applied to a blade 3 and to the surface of the photosensitive medium 1. The liquid thus applied is flowed along the blade 3 toward the opposite ends thereof and collected through grooves [not] shown in FIG. 1*a* provided at the opposite end portions of the photosensitive medium 1. During that while, the photosensitive medium 1 remains stationary so that any solidified toner present on the blade 3 and on the surface portion of the photosensitive medium 1 adjacent to the blade is brought into wet condition.

Subsequently, a copy switch (not shown) is closed to rotate the photosensitive medium 1 for a copying process and concurrently therewith, the distributor means 8 is changed over to supply the developing liquid from the liquid delivery means 6 such *a* pump into the developing bath or trough 2' of the developing means 2 and cut off the liquid supply to the spray conduit 10.

Such arrangement ensures cleaning liquid to be supplied to the blade and the surface of the photosensitive medium so as to wet the solidified toner thereon before copying operation or rotation of the drum 1 is initiated, thus obviating the possibility of inadvertently neglecting supply of the cleaning liquid.

Instead of using the distributor means 8 such as *a* change-over valve or the like, it is possible to employ such a design that liquid is supplied both to the cleaning portion and the developing bath 2' all the time when the main switch is closed.

Figure 2:
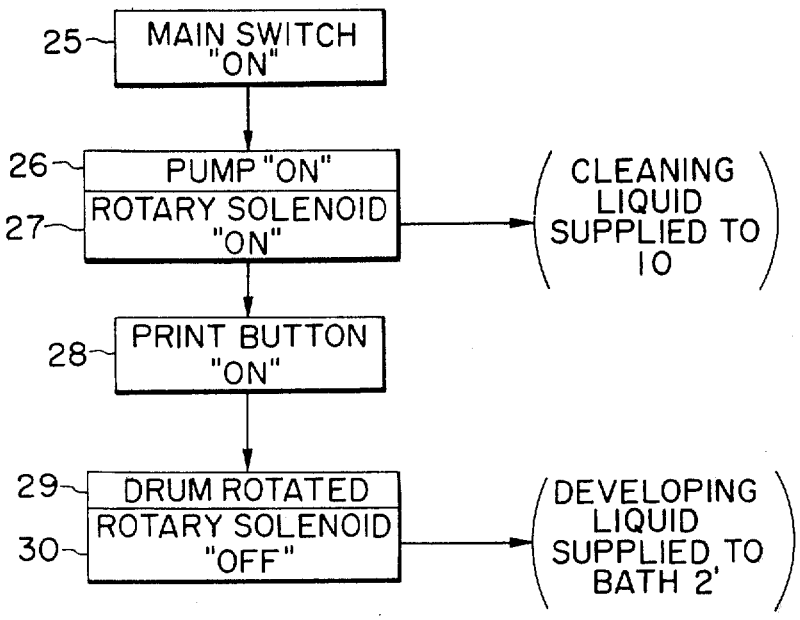
FIG. 2 is a block diagram showing the control of liquid supply to liquid type developing means and to cleaning means.

The block diagram of FIG. 2 shows the control of the liquid supply. Upon closing of the main switch 25, the pump 26 is operated while the rotary solenoid 27 is rotated, so that the cleaning liquid is supplied to the liquid application means 10. When the print button 28 is closed, the photosensitive medium starts rotating while the rotary solenoid 27 is stopped from rotating. As a result, developing liquid is supplied into the developing bath 2'.

Figure 3A:
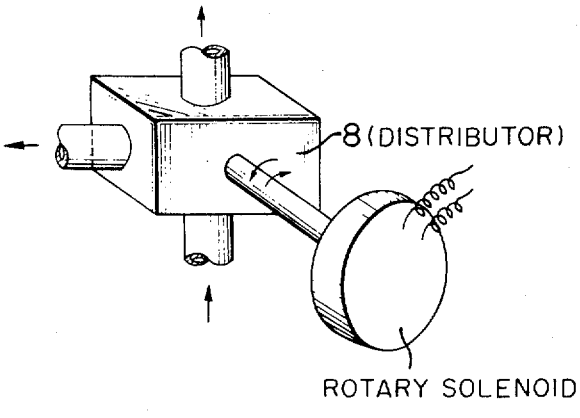
FIG. 3 ( a ) is an enlarged perspective view of a distributor used in the electrophotographic copying machine of FIG. 1.
Figure 3B:
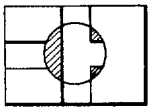
Figure 3C:
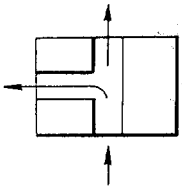

FIG. 3 shows details of the distributor means 8. FIG. 3 ( b ) shows the distributor means in the position for distributing the liquid solely to the cleaning liquid application means 10, and FIG. 3 ( c ) shows the position for distributing the liquid both to the developing means 2 and the cleaning liquid application means 10.

Figure 4:
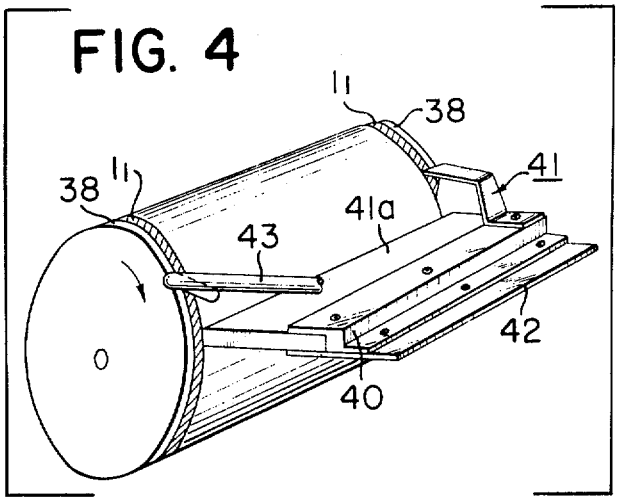
[ FIG. 4 is a perspective view of the cleaning means according to another embodiment of the present invention.
Figure 5:
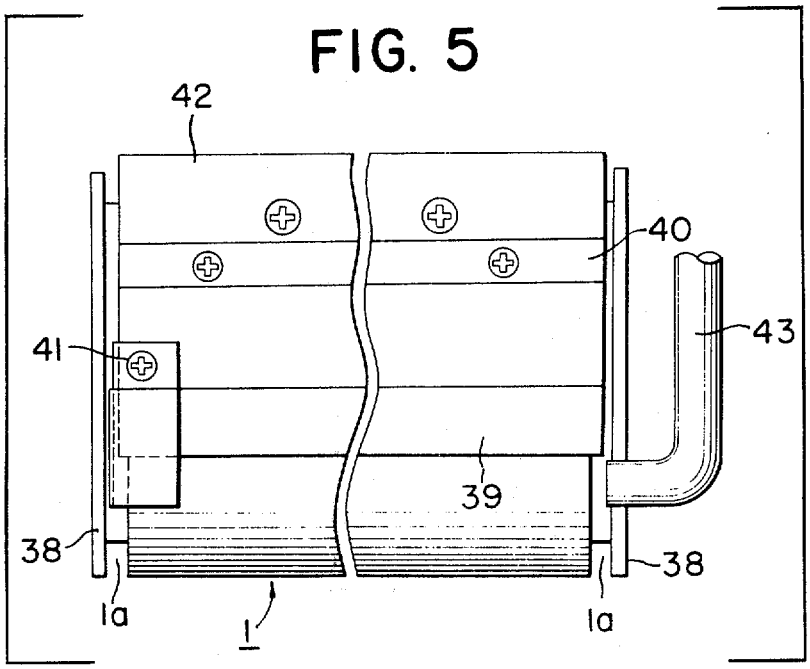
FIG. 5 is a top plan view of the cleaning means shown in FIG. 4.]

[FIGS. 4 and 5 show another embodiment of the cleaning means. As shown, a blade 39 supported by supporting plates 40 and 42 is disposed with one side edge thereof in contact with the photosensitive medium 1. The photosensitive medium has a pair of grooves $1_1$ formed circumferentially at the opposite end portions thereof. The blade 39 has a liquid blocking plate 41 provided at one end thereof in such a manner that the side edge 41a of the liquid blocking plate 41 is received in the groove $1_1$ formed at one end 38 of the photosenstiive medium 1. Above the other end of the blade 39 which is remote from the liquid blocking 41, there is disposed a developing liquid application conduit 43 with its open end portion somewhat inclined downwardly. When developing liquid is discharged through the developing liquid application conduit 43, the liquid discharged is allowed to stay in the contact area between the surface of the photosensitive medium and the blade 39 due to the flow rate of the liquid and to the liquid blocking plate 41. Thus, the toner sticking to such area can readily be wetted and fluidized by the liquid.

If desired, the blade 39 may be inclined downwardly with respect to the developing liquid application conduit 43 so as to enhance the staying effect of the developing liquid with the aid of the flow rate and the liquid blocking plate. ]

We claim:

1. An electrophotographic copying machine including a photosensitive medium, electrostatic latent image formation means, liquid type developing means, transfer means and cleaning means, said photosensitive medium having developing liquid collection grooves formed at the opposite end portions thereof, said cleaning means comprising a blade of resilient material having one edge disposed in contact with said medium, a cleaning liquid tank, and means for applying cleaning liquid to the areas of said medium and said blade near the contact area therebetween before cleaning action is started.

2. An electrophotographic copying machine as defined in claim 1, wherein said cleaning means further comprises liquid delivery means for delivering cleaning liquid from said cleaning liquid tank to said cleaning liquid application means.

3. An electrophotographic copying machine as defined in claim 2, wherein liquid in said cleaning liquid tank is developing liquid, and said liquid delivery means delivers developing liquid from said tank to said cleaning liquid application means and to said liquid type developing means.

4. An electrophotographic copying machine as defined in claim 3, wherein said liquid delivery means includes distributor means for distributing the developing liquid from said cleaning liquid tank to said cleaning liquid application means before cleaning action is started, and for distributing the developing liquid from said tank to said developing means during the cleaning action.

[5. An electrophotographing copying machine as defined in claim 1, wherein said cleaning liquid application means includes a developing liquid conduit disposed adjacent to one end of said blade in such a manner that the open end portion of said conduit is somewhat inclined downwardly, and a cleaning liquid blocking plate provided at the other end of said blade in corresponding relationship with one of said grooves formed on said photosensitive medium. ]

6. An electrophotographic copying machine as defined in claim 1, wherein said blade is oriented in a counter-direction with respect to the direction of movement of said photosensitive medium.

*7. An electrophotographic copying machine including a medium capable of bearing thereon an electrostatic latent image of the original to be copied, means for establishing said electrostatic latent image on said medium, liquid developing means for developing said electrostatic latent image, transfer means for transferring the thus developed image to copy material and cleaning means, said cleaning means comprising a cleaning member disposed in contact with said medium for cleaning same for repeated use, a cleaning liquid tank, and means for applying cleaning liquid from said liquid tank to the areas of both said medium and said cleaning member near the contact area therebetween before cleaning action of said cleaning member is started.*

*8. An electrophotographic copying machine as defined in claim 7, wherein said cleaning means further comprises liquid delivery means for delivering cleaning liquid from said cleaning liquid tank to said means for applying cleaning liquid.*

*9. An electrophotographic copying machine as defined in claim 8, wherein liquid in said cleaning liquid tank is developing liquid, and said liquid delivery means delivers developing liquid from said tank to said means for applying cleaning liquid and to said liquid developing means.*

*10. An electrophotographic copying machine as defined in claim 9, wherein said liquid delivery means includes distributor means for distributing the developing liquid from said cleaning liquid tank to said means for applying cleaning liquid before cleaning action is started, and for distributing the developing liquid from said tank*

*to said liquid developing means during the cleaning action.*

*11. An electrophotographic copying machine as defined in claim 7 further comprising means for collecting cleaning liquid applied to said medium and said cleaning member.*

*12. An electrophotographic copying machine including a medium capable of bearing thereon an electrostatic latent image of the original to be copied, means for establishing said electrostatic latent image on said medium, liquid developing means for developing said electrostatic latent image, transfer means for transferring the thus developed image to copy material and cleaning means, said cleaning means comprising a blade of resilient material having one edge disposed in contact with said medium for cleaning same for repeated use, a cleaning liquid tank, and means for applying cleaning liquid from said liquid tank to the areas of both said medium and said blade near the contact area therebetween before cleaning action of said cleaning blade is started.*

*13. An electrophotographic copying machine as defined in claim 12, wherein said cleaning means further comprises liquid delivery means for delivering cleaning liquid from said cleaning liquid tank to said means for applying cleaning liquid.*

*14. An electrophotographic copying machine as defined in claim 13, wherein liquid in said cleaning liquid tank is developing liquid, and said liquid delivery means delivers developing liquid from said tank to said means for applying cleaning liquid and to said liquid developing means.*

*15. An electrophotographic copying machine as defined in claim 14, wherein said liquid delivery means includes distributor means for distributing the developing liquid from said cleaning liquid tank to said means for applying cleaning liquid before cleaning action is started, and for distributing the developing liquid from said tank to said liquid developing means during the cleaning action.*

*16. An electrophotographic copying machine as defined in claim 12 further comprising means for collecting cleaning liquid applied to said medium and said blade.*

*17. An electrophotographic copying machine as defined in claim 12, wherein said means for applying cleaning liquid includes a liquid conduit having an opening therein disposed adjacent to said blade with the opening inclined downwardly.*

*18. An electrophotographic copying machine including a photosensitive medium in the form of a rotary drum electrostatic latent image formation means for forming on said photosensitive medium an electrostatic image of the original to be copied, liquid developing means for developing said electrostatic latent image, transfer means for transferring the thus developed image to copy material, and cleaning means, said cleaning means comprising a blade of resilient material having one edge disposed in contact with said medium, a cleaning liquid tank, and means for applying cleaning liquid from said liquid tank to the areas of both said medium and said blade near the contact area therebetween before cleaning action of said blade is started.*

*19. An electrophotographic copying machine as defined in claim 18, wherein said cleaning means further comprises liquid delivery means for delivering cleaning liquid from said cleaning liquid tank to said means for applying cleaning liquid.*

*20. An electrophotographic copying machine as defined in claim 19, wherein liquid in said cleaning liquid tank is developing liquid, and said liquid delivery means delivers developing liquid from said tank to said means for applying cleaning liquid and to said liquid developing means.*

*21. An electrophotographic copying machine as defined in claim 20, wherein said liquid delivery means includes distributor means for distributing the developing liquid from said cleaning liquid tank to said means for applying cleaning liquid before cleaning action is started, and for distributing the developing liquid from said tank to said liquid developing means during the cleaning action.*

*22. An electrophotographic copying machine as defined in claim 18 further comprising means for collecting cleaning liquid applied to said medium and said blade.*

*23. An electrophotographic copying machine as defined in claim 18, wherein said means for applying cleaning liquid includes a liquid conduit having an opening therein disposed adjacent to said blade with the opening inclined downwardly.*

*24. An electrophotographic copying machine including a photosensitive medium, electrostatic latent image formation means for forming on said photosensitive medium an electrostatic image of the original to be copied, liquid developing means, post charger means for applying a corona charge on the thus developed image, transfer means for thereafter transferring the developed image to copy material, and cleaning means, said cleaning means comprising a blade of resilient material having one edge disposed in contact with said medium, a cleaning liquid tank, and means for applying cleaning liquid from said liquid tank to the areas of both said medium and said blade near the contact area therebetween before cleaning action of said blade is started.*

*25. An electrophotographic copying machine including a drum type medium rotatable about a horizontal axis and capable of bearing thereon an electrostatic latent image of the original to be copied, means for establishing said electrostatic latent image on said medium, liquid developing means positioned below the horizontal axis of said drum type medium for developing said electrostatic latent image, transfer means for transferring the thus developed image to copy material and cleaning means, said cleaning means comprising a cleaning member disposed in contact with said medium for cleaning same for repeated use, a cleaning liquid tank, and means for applying cleaning liquid from said liquid tank to the areas of both said medium and said cleaning member near the contact area therebetween before cleaning action of said cleaning member is started, said transfer means, cleaning means and means for establishing the latent image being positioned sequentially around the drum type medium from the developing means in the direction of rotation.*

*26. An electrophotographic copying machine as in claim 25 wherein said cleaning means is located above said horizontal axis and at the periphery of said drum type medium where it rotates downwardly.*

*27. An electrophotographic copying machine including a drum type medium rotatable about a horizontal axis and capable of bearing thereon an electrostatic latent image of the original to be copied, means for establishing said electrostatic latent image on said medium, liquid developing means positioned below the horizontal axis of said drum type medium for developing said electrostatic latent image, transfer means for transferring the thus de-*

*veloped image to copy material and cleaning means, said cleaning means comprising a blade of resilient material having one edge disposed in contact with said medium for cleaning same for repeated use, a cleaning liquid tank, and means for applying cleaning liquid from said liquid tank to the areas of both said medium and said blade near the contact area therebetween before cleaning action of said cleaning blade is started, said transfer means, cleaning means and means for establishing the latent image being positioned sequentially around the drum type medium from the developing means in the direction of rotation.*

*28. An electrophotographic copying machine as in claim 27 wherein said cleaning means is located above said horizontal axis and at the periphery of said drum type medium where it rotates downwardly.*

*29. An electrophotographic copying machine including a drum type photosensitive medium rotatable about a horizontal axis, electrostatic latent image formation means for forming on said photosensitive medium an electrostatic image of the original to be copied, liquid developing means positioned below the horizontal axis of said drum type photosensitive medium for developing said electrostatic latent image, transfer means for transferring the thus developed image to copy material, and cleaning means, said cleaning means comprising a blade of resilient material having one edge disposed in contact with said medium, a cleaning liquid tank, and means for applying cleaning liquid from said liquid tank to the areas of both said medium and said blade near the contact area therebetween before cleaning action of said blade is started, said transfer means, cleaning means and means for forming the latent image being positioned sequentially around the drum type photosensitive medium from the developing means in the direction of rotation.*

*30. An electrophotographic copying machine as in claim 29 wherein said cleaning means is located above said horizontal axis and at the periphery of said drum type medium where it rotates downwardly.*

* * * * *